United States Patent [19]

Cashin

[11] Patent Number: 5,600,206
[45] Date of Patent: Feb. 4, 1997

[54] SOLID STATE SOUND LAMP

[76] Inventor: James A. Cashin, 18730 Oxnard St., #208, Tarzana, Calif. 91356

[21] Appl. No.: 493,911

[22] Filed: Jun. 23, 1995

[51] Int. Cl.⁶ ..................... G11B 7/00
[52] U.S. Cl. ................ 315/32; 315/33; 352/26
[58] Field of Search .............. 352/27, 26; 315/32, 315/33, 35, 149, 150, 151, 152, 155

[56] References Cited

U.S. PATENT DOCUMENTS

| 4,085,296 | 4/1978 | Keegan | 179/100.3 R |
| 4,139,382 | 2/1979 | Stephens | 96/3 |
| 4,367,930 | 1/1983 | Kolb | 352/27 |

*Primary Examiner*—Robert Pascal
*Assistant Examiner*—David H. Vu
*Attorney, Agent, or Firm*—Andra M. Vaccaro, Esq.

[57] ABSTRACT

The present invention is a sound light assembly for reading encoded information on a film utilizing cyan, magenta and yellow color dyes rather than silver emulsion, that may be used with existing projection equipment. The invention comprises at least one narrow spectrum LED array of a plurality of LED die that produce high intensity illumination with very little infrared energy, a current regulating device, compensation resistors for correcting any variations between the individual LED die intensity and an immersion lens for redirecting the wide LED output pattern into a small cone of light. Each LED array has a peak energy that coincides with the maximum density of a corresponding color dye layer.

9 Claims, 2 Drawing Sheets

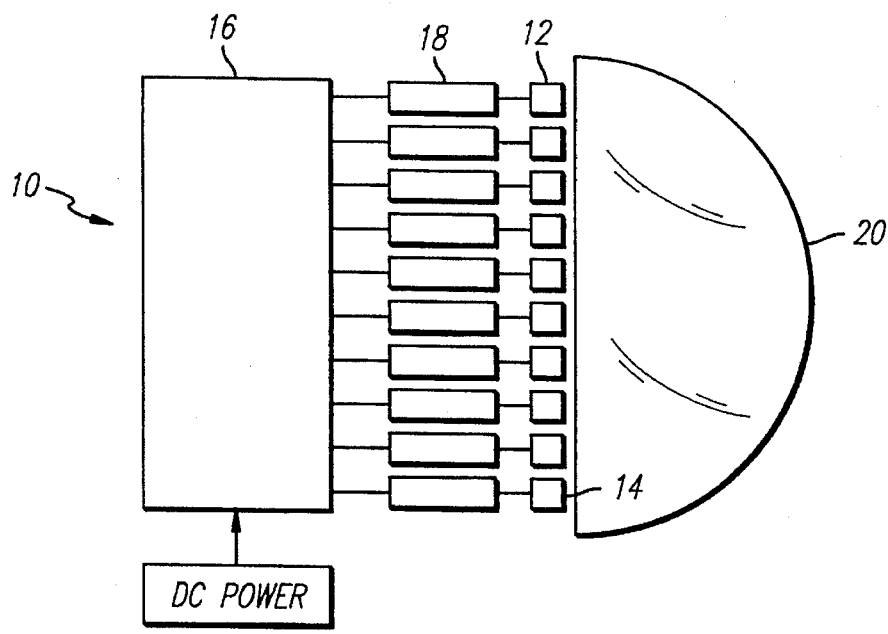
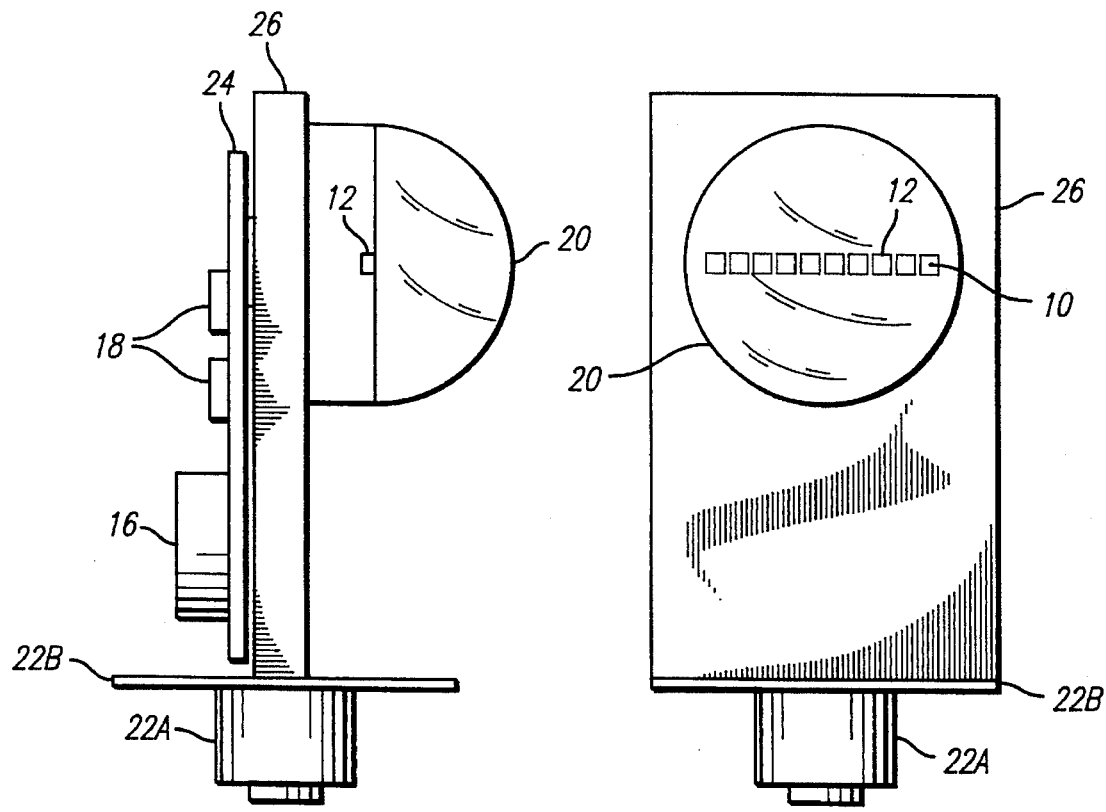

SOLID STATE SOUND LAMP

BACKGROUND OF THE INVENTION

Field of the Invention

The invention relates to the light source used to read digital and analog information on photographic color dye film.

BACKGROUND OF THE INVENTION

In the prior art, during the late 1920's, a process was developed whereby monophonic analog sound was recorded photographically on black and white motion picture film. In order to decode the sound, a tungsten lamp was focused through a lens and a scanning slit onto the film on which the sound was recorded and thereafter onto a photoelectric pickup device, where it was then processed into sound.

When color film was introduced in the 1950's, the process that had been previously used on black and white films to record an analog soundtrack would not work. The reason was that the color dyes used in making the film transmitted infrared light whereas the silver used on black and white film blocked infrared light. Since the incandescent sound light sources used to decode the soundtrack contained high amounts of infrared energy, it could not read the film modulation and created a great deal of noise. Therefore, it became necessary to add a black and white silver process in the soundtrack area to the color film.

Now, with the ever increasing public concern for the environment, film manufacturers are being pressured to omit the silver emulsion processing altogether and leave only the color dye processing on all 35mm prints. Color dyes block only visible light and are transparent to infrared light. Current tungsten incandescent sound lamps emit the majority of their energy in the infrared spectrum. Thus, they are not well suited for reproduction of silverless dye soundtracks. Further, the incandescent tungsten sound light sources have several problems when they are used to scan photographic color dye soundtracks.

One of the problems with incandescent sound light sources is that the average life of the incandescent light source is less than 1000 hours requiring frequent replacement. Second, the excessive heat in the incandescent sound light source distorts the shape of the filament and causes intensity variations over time which result in amplitude distortion in the sound playback. Third, the vibration components of the projection machine can cause spurious microphonic problems in the sound system.

Thus, a sound light source is needed to read soundtracks on color dye films which omit the silver emulsion processing.

SUMMARY OF THE INVENTION

The present invention comprises a sound light source that overcomes the problems caused by the prior art incandescent light sources by combining leading edge LED technology with precision optics. The present invention is a replacement light source for the incandescent light source which illuminates the color dye film so the analog or alternative information encoded onto the color dye layers can be read. It combines long life, minimal heat dissipation and immunity from microphonic problems.

Typical color dye film is composed of three dye layers—a magenta dye layer, a cyan dye layer, and a yellow dye layer. Release prints can be made utilizing any or all of these dye layers. Any new projector sound light source must produce high intensity illumination in the visible range.

Specifically, LED light sources can emit high levels of narrow spectral energy with very little infrared energy. Thus, if an LED process is selected that has a peak energy that coincides with the maximum density of a particular dye layer, an efficient, high quality system can be realized. Tests have shown that the a 660 nm GaAlAs ultrabright red coincides perfectly with the cyan dye density curves. (See curves in FIG. 1.) The cyan color dye layer has the best resolution on color dye film.

In order to simulate the sound light source of a tungsten filament, it is necessary to assemble a custom array of approximately ten to twelve individual LED die arranged in a straight line. The spacing between the LED die must be less than 15% of the size of the individual die in order to produce a band of light with minimal variation in intensity. The array is powered by a current regulating device such as a current regulator integrated circuit or resistor. Variations between LED die intensity is corrected through the use of compensation resistors.

In the present invention, in order to effectively match the array to existing projector optics, an immersion type lens is used in front of the LED die array. The lens redirects the wide LED output pattern into a small cone of light in order to allow it to efficiently enter existing projector optics.

Finally, the entire assembly is mounted in a standard sound lamp base to permit it to be easily installed in existing projection equipment.

BRIEF DESCRIPTION OF THE DRAWINGS

FIG. 2 is a block diagram of the preferred embodiment of the present invention; and FIG. 3 is a block diagram of the present invention as it is mounted onto a base; and FIG. 4 is a block diagram of the present invention as it is mounted in existing projection equipment.

DESCRIPTION OF PREFERRED EMBODIMENTS

Figure 1:
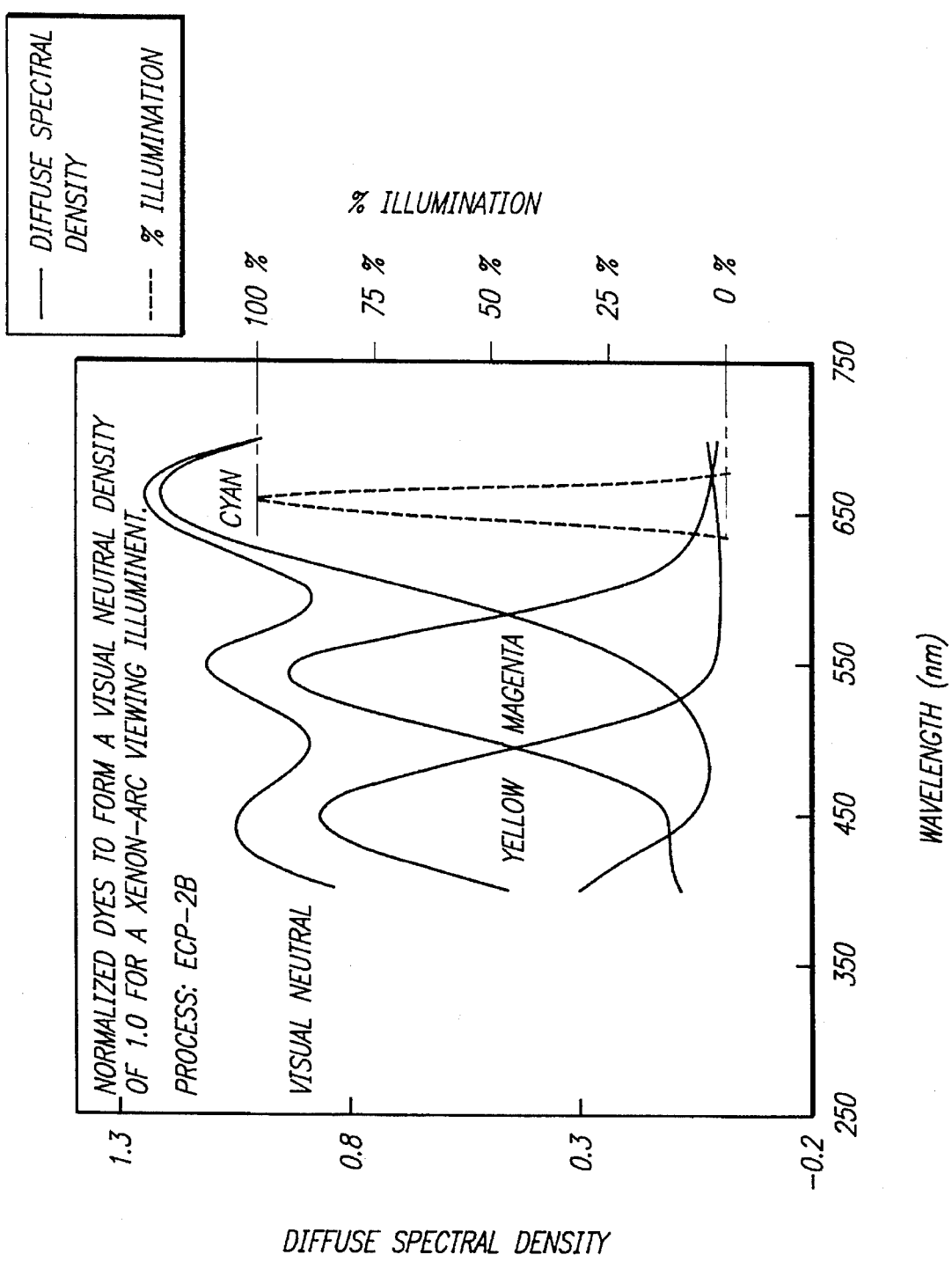
FIG. 1 is a graph illustrating the typical spectral response of the dye layers on color print film and a GaAlAs 660 red LED array.

Referring first to FIGS. 2, 3 and 4, the preferred embodiment of the present invention comprises fitting existing projectors with a sound light source 10 containing a narrow spectrum red LED array in order to be able to read the analog information on a film utilizing color dyes rather than silver emulsion.

The present invention comprises a sound light source 10 that produces narrow spectrum high intensity illumination with very little infrared energy. Thus, the sound light source 10 has a peak energy that coincides with the maximum density of a color dye layer to create an efficient, high quality system. Tests have shown that a 660 nm GaAlAs ultrabright red coincides perfectly with the cyan dye density curves. (See curves in FIG. 1.) In the preferred embodiment, the light source 10 peak energy coincides with the cyan color dye layer for the best modulation effect.

Referring more specifically to FIGS. 2 and 3, in order to simulate the light source of a tungsten filament, it is necessary to assemble a custom array 12 of approximately ten to twelve individual LED die 14 arranged in a straight line. The spacing between the LED die 14 in the array 12 must be less than fifteen percent (15%) of the size of the individual die 14 to produce a band of light with minimal variation in intensity. The array is powered by an unmodulated dc power supply through a current regulating device 16 such as a current regulator integrated circuit (as shown) or by resistors. Any variations between the LED die 14 intensity are corrected through the use of compensation resistors 18. The intensity balancing resistors 18 and the current regulator 16 are mounted on circuit board 24 as shown in FIG. 3.

In the present invention, in order to effectively match the array to existing projector optics, an immersion type lens 20 is used. The lens 20 redirects the wide LED output pattern into a small cone of light to allow it to efficiently enter the existing projector optics, as shown in FIG. 3.

Referring more specifically to FIGS. 3 and 4, the entire solid state sound lamp assembly 10 is mounted in a standard lamp base 22(a) and 22(b) to permit it to be easily installed in existing projection equipment. Thereafter, the invention is housed in housing 26 which contains an opening for the immersion lens 20.

Thus, the present invention combines leading edge LED technology with precision optics so that it is now possible to replace the incandescent light source to illuminate color dye film so the analog or alternative information encoded onto the color dye layer can be read.

In the present invention, the LED die array will illuminate analog modulation on the color dye layers. Utilizing narrow spectrum LED's, the modulation effect will occur only by the cyan layer with minimal effect by the other dye layers. If the exposure on the other dye layers is off in any manner or if the other dye layers are not used, it will not effect the overall clarity of the analog sound.

The same technique can be used with other dye layers provided the spectral peak coincides with the layer used such that multiple information on different dye layers can be simultaneously decoded. In addition, multiple color arrays can be incorporated in a single housing to allow playback of analog as well as alternative information. For example, digital information on the yellow or magenta dye layer may be simultaneously decoded by using additional arrays of different colors.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A sound lamp assembly used in a sound decoding system having a decoding receptor for decoding information on film having a plurality of color dye layers of different peak densities on which at least one color dye layer contains encoded information, comprising:

power supply means;

unmodulated illuminating means comprised of a plurality of LED die attached to said power supply means, said unmodulated illuminating means creating illumination with minimal variation in intensity, said unmodulated illuminating means providing a signal whose wavelength coincides only with the peak density of the color dye layer containing the encoded information;

limiting means for regulating the power supply means so that it is constant; whereby said limiting means corrects any minor variances in intensity between said multiplicity of LED die, and optics means for collecting diffuse illumination of the illuminating means and directing it toward the receptor.

2. The sound lamp assembly of claim 1 further comprising:

intensity balancing means attached to said plurality of LED die for correcting any variations in intensity between the plurality of LED die.

3. The sound lamp of claim 1, further comprising a housing means for housing said illuminating and optics means, whereby said assembly may be easily installed in standard projection equipment.

4. A sound light assembly used in connection with a decoding means for reading encoded information on a film having cyan, magenta and yellow color dye layers, each of the layers having its own peak density, comprising:

an unmodulated power supply;

several non-amplitude modulated narrow spectrum LED arrays, each of said arrays attached to said power supply, said each array comprised of a plurality of individual LED die and each said array corresponding to a different color dye layer, wherein each of said arrays has its own individual output signal having a wavelength and density which coincide with the peak density of its corresponding color dye layer such that each of said arrays illuminates any encoded information on its corresponding color dye layers simultaneously; and optical focusing means for collecting the output signals of each of said arrays and directing said signals toward said decoding means.

5. The assembly of claim 4, further comprising;

a current regulating device attached to each of said LED arrays to ensure that the output signal from said arrays is constant and unmodulated; and compensation resistors for correcting any intensity variations between each of the individual LED dies in each of said arrays.

6. The assembly of claim 5, wherein said output signal of at least one of said LED arrays has a peak wavelength that coincides with the cyan color dye layer for optimal decoding of the encoded information on the cyan layer.

7. The assembly of claim 4, wherein each of said LED arrays comprise approximately ten to twelve individual LED die 14 arranged in a straight line which are spaced apart a distance that must be less than fifteen percent (15%) of the size of the individual die to produce a band of light with minimal variation in intensity.

8. The assembly of claim 4 further comprising an immersion type lens for directing the signal output of each of said LED arrays into a small cone of light.

9. The assembly of claim 4, further comprising a housing means for housing said LED arrays and said optical focusing means, whereby said assembly may be easily installed into standard projection equipment in place of the currently existing lamp.

* * * * *